United States Patent [19]

Iwamura et al.

[11] Patent Number: 5,966,449
[45] Date of Patent: *Oct. 12, 1999

[54] METHOD AND NETWORK FOR COMMUNICATING BETWEEN A GROUP OF ENTITIES A TEXT ENCRYPTED USING AN ENCRYPTION KEY INTRINSIC TO THE GROUP OF ENTITIES IN A NETWORK HAVING A PLURALITY OF ENTITIES AND A CENTER

[75] Inventors: Keiichi Iwamura; Takahisa Yamamoto, both of Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/359,636

[22] Filed: Dec. 20, 1994

[30] Foreign Application Priority Data

Dec. 22, 1993 [JP] Japan .................................. 5-346642

[51] Int. Cl.$^6$ ...................................................... H04L 9/00
[52] U.S. Cl. .................................. 380/44; 380/21; 380/49
[58] Field of Search .................................. 380/21, 49, 44

[56] References Cited

U.S. PATENT DOCUMENTS

| | | | |
|---|---|---|---|
| 4,607,137 | 8/1986 | Jansen | 380/21 |
| 4,771,459 | 9/1988 | Jansen | 380/21 |
| 4,853,962 | 8/1989 | Brockman | 380/44 |
| 4,912,762 | 3/1990 | Lee et al. | 380/24 |
| 5,136,642 | 8/1992 | Kawamura et al. | 380/21 |
| 5,179,591 | 1/1993 | Hardy et al. | 380/21 |

(List continued on next page.)

FOREIGN PATENT DOCUMENTS

| | | |
|---|---|---|
| 0123360 | 10/1984 | European Pat. Off. . |
| 0207534 | 1/1987 | European Pat. Off. . |
| 4150428 | 5/1992 | Japan .................................. H04G 9/28 |

OTHER PUBLICATIONS

Chikazawa et al "Improved Identity-Based Key Sharing System for Multiaddress Communication," Electronics Letters, vol. 28, pp. 1015–1017.

R. Blom, "Non-Public Key Distribution," Crypto '82 (1982).

Tujii et al, "ID-Based Cryptosystem Using Discrete Logarithm Problem," Elect. Lett., vol. 23, pp. 1318–1320.

Patent Abstracts of Japan, vol. 016 No. 432 (E–1262), Sep. 9, 1992 & JP–A–04 150428 (Fujitsu Ltd) May 22, 1992.

Electronics Letter, May 21, 1992, UK, vol. 28, No. 11, ISSN 0013–5194, pp. 1015–1017, Chikazawa T et al "Improved identity-based key sharing system for multiaddress communication", p. 1016, left column, line 7–right column, line 19.

Tujii et. al., "ID-Based Cryptosystem Using Discrete Logarithm Problem", Elect. Lett., vol. 23, No. 24, Nov. 1987.

Primary Examiner—Gail O. Hayes
Assistant Examiner—Hrayr A. Sayadian
Attorney, Agent, or Firm—Fitzpatrick, Cella, Harper & Scinto

[57] ABSTRACT

In a network having a plurality of entities and a center, the center creates random numbers for all the combinations of two of the entities within the network, and delivers to each entity random numbers created for those combinations involving that entity. A sender entity selects a random number corresponding to the combination of that entity and the destination entity from a group of random numbers delivered to the sender entity, encrypts a communication text using an encryption key determined by the selected random number and sends the encrypted text to the destination entity. The destination entity selects a random number corresponding to the combination of itself and the sender entity from the random numbers delivered to the destination entity, and decodes a cipher text received using an encryption key determined by the selected random number.

36 Claims, 4 Drawing Sheets

U.S. PATENT DOCUMENTS

| | | | |
|---|---|---|---|
| 5,185,797 | 2/1993 | Barrett et al. | 380/21 |
| 5,199,069 | 3/1993 | Barrett et al. | 380/28 |
| 5,199,070 | 3/1993 | Matsuzaki | 380/30 |
| 5,202,921 | 4/1993 | Herzberg et al. | 380/23 |
| 5,222,137 | 6/1993 | Barret et al. | 380/21 |
| 5,230,020 | 7/1993 | Hardy et al. | 380/21 |
| 5,267,314 | 11/1993 | Stambler | 380/24 |
| 5,268,962 | 12/1993 | Abadi et al. | 380/21 |
| 5,325,433 | 6/1994 | Torii et al. | 380/30 |
| 5,341,427 | 8/1994 | Hardy et al. | 380/21 |
| 5,355,412 | 10/1994 | Kangas | 380/23 |
| 5,357,571 | 10/1994 | Banwart | 380/21 |
| 5,369,705 | 11/1994 | Bird et al. | 380/21 |
| 5,519,778 | 5/1996 | Leighton et al. | 380/30 |

METHOD AND NETWORK FOR COMMUNICATING BETWEEN A GROUP OF ENTITIES A TEXT ENCRYPTED USING AN ENCRYPTION KEY INTRINSIC TO THE GROUP OF ENTITIES IN A NETWORK HAVING A PLURALITY OF ENTITIES AND A CENTER

BACKGROUND OF THE INVENTION

1. Field of the Invention

The present invention relates to a communication method using encryption, and more particularly to a method and network for sharing between a group of communicating entities (subjects of communication such as an apparatus, a software, a man and a collection thereof) an encryption key intrinsic to the group of entities prior to the communication.

2. Related Background Art

In communications using encryption, the security of communication contents significantly relies on the fact that only the entities which will become a sender and a receiver know an encryption key but no other entities know the encryption key, whereby a safer and more efficient encryption key sharing method is desired.

The encryption key sharing method has been described in detail in the documents as listed below:

R. Blom, "Non-public key distribution", CRYPTO' 82, 1982

S. Tujii, T. Ito and K. Kurosawa, "ID-based cryptosystem using discrete logarithm problem", Elect. Lett., Vol. 23, No. 24, 1987.11.

Conventionally, the encryption key sharing methods are largely classified into the following four categories, the features of which will be presented below.

The first encryption key sharing method is a method in which each entity shares an encryption key with all the communication partners supposed by making individual arrangements through the communication using other encryption or by physical means. The first encryption key sharing method has a higher security, but takes much trouble when there are a great number of communication partners supposed. Since it is difficult to make arrangements for the key with indefinitely many unknown partners, the first encryption key sharing method is unsuitable for encryption communication with such indefinitely many partners.

The second encryption key sharing method is a method in which each entity creates public information based on its own secret information, registers this public information into a public film which can be freely read from but is strictly managed for writing or deleting, and in making communication, calculates an encryption key to be shared from its own secret information and the partner's public information. The second encryption key sharing method allows the sharing of an encryption key with any entity by referring to the public film as necessary in making communication, and is therefore available for encryption communication with indefinitely many partners, but requires a management system for the public film or corresponding public information. Further, in a large-scale network, each entity may take much trouble in referring to the partner's public information.

The third encryption key sharing method is a method in which each entity exchanges a value generated from random numbers secretly determined, using the public information determined intrinsic to a communication path, to calculate an encryption key to be shared. The third encryption key sharing method allows simply the sharing of encryption key with any entity only by exchanging the random number information. However, prior to encryption communication, a preliminary communication for exchanging the random number must be performed, in which it is not possible to confirm the communication partner. Therefore, a so-called "impersonation" may arise to attempt to pass the approval by pretending to be another person.

The fourth encryption key sharing method is a method in which the center accepts an identifier (ID) of each entity such as a name or a telephone number, generates a secret key corresponding to its ID, using a secret algorithm intrinsic to the center, and sends it to each entity, each entity calculating an encryption key to be shared from its secret key and the communication partner ID. This method is called an ID-based key sharing method, and allows for the confirmation of the communication partner. This method is further subdivided into a method of requiring preliminary communication prior to encryption communication and a method of not requiring preliminary communication. The method of requiring preliminary communication is unusable like an electronic mail capable of sending only the communication text by encryption, whereas the method of not requiring preliminary communication can be used like the electronic mail and has wider service ranges.

The key sharing method of not requiring preliminary communication is expected for use in the future, and has the following features.

First, as preparation, the center determines a secret algorithm $g(i, j)$ (where i, j is ID, and assumed to be exchangeable), and delivers $gi(j)$ with i fixed to each entity. Where it is desired that the entities A, B share the key, A enters ID of B into its own algorithm to obtain a common key kAB:

$$kAB = gA(B).$$

Also, B enters ID of A into its own algorithm to obtain the same common key kAB:

$$kAB = gB(A)$$

However, the ID-based key sharing method of not requiring the above preliminary communication had some problems as stated below.

There is a possibility that one algorithm $g(i, j)$ which is a secret of the center may be destroyed by the collusion of a plurality of entities having $gi(j)$.

Also, since the safety relies on mathematical characteristics of the system such as the computational complexity or the rank of matrix used, the extended safety or system is difficult to attain.

Further, if only one center is provided, an attack on security from the center itself cannot be prevented, because the center has a grasp of all the secrets. This will be further detailed below.

In the conventional example, it is supposed that the center is reliable, or a plurality of centers which are not in collusion are provided, but nowadays when there is no public institution or system for the key sharing method, the center may be possibly a company which has manufactured the key sharing method or a firm which markets the key sharing method by obtaining permission from its manufacturing company. In such situations, it is not ensured that the center is reliable, nor that there are a plurality of centers which are not in collusion with one another. Accordingly, from this aspect, none of the conventional key sharing methods without preliminary communication are safe, but no safe methods in practice have been proposed.

Also, the conventional key sharing methods without preliminary communication have the following problem associated with the collusion, even though the center is reliable. For example, it is supposed that the same key sharing method is adopted for A firm and B firm, and shared among a number of personnel in each of those firms. Further, it is supposed that the A firm knows that the B firm also adopts the same key sharing method, but the B firm does not know what other firms adopt the same key sharing method. If there are personnel necessary for collusion in the A firm, the secret of the center is exposed by the collusion only within the A firm, and the secret of the B firm is also exposed. As a result, the B firm is subjected to a damage such as tapping or tampering, but cannot tell who the offender is. Although this situation can be resolved by providing separate secret algorithms for the A firm and the B firm, the secret communication between A and B firms is not assured.

SUMMARY OF THE INVENTION

Thus, it is an object of the present invention to provide an encryption key sharing method which is capable of sharing a key simply and safely without requiring any preliminary communication between entities, and a communication method and system using its encryption key.

Also, it is another object of the invention to provide an encryption key sharing method in which the encryption key that is a secret between two entities is safe against collusion between a plurality of entities.

Further, it is another object of the invention to provide an encryption key sharing method which is capable of simply assuring the safety of an encryption key without depending on such things as computational complexity and without lowering the safety against the increased number of entities.

Still further, it is another object of the invention to provide an encryption key sharing method which is safe against attack from the center.

Also, it is another object of the invention to provide an encryption key sharing method which makes it easy to identify the offender when a secret is leaked out.

According to one aspect, the present invention which achieves these objectives relates to a communication method between entities in a network having a plurality of entities and a center, comprising the steps of:

the center creating pieces of information which are independent of one another for all the combinations composed of two of identification numbers corresponding to the number of entities within the network;

the center converting one-to-one an identifier of each entity into an identification number in terms of a predetermined function;

the center delivering to each entity a group of pieces of information created for the combinations involving an identification number obtained by converting an identifier of its entity;

a sender entity converting an identifier of the own entity and an identifier of a sending destination entity into respective identification numbers in terms of the predetermined function, selecting information corresponding to a combination of the identification numbers obtained by conversion from a group of pieces of information delivered to the own entity, encrypting a communication text using an encryption key determined by selected information to send it to the sending destination entity; and the sending destination entity converting the identifier of the own entity and the identifier of the sender entity into respective identification numbers in terms of the predetermined function, selecting information corresponding to a combination of the identification numbers obtained by conversion from the group of pieces of information delivered to the own entity and decoding a cipher text received using the encryption key determined by the selected information.

Also, according to another aspect, the present invention relates to a communication method between entities in a network having a plurality of entities and a center, comprising the steps of:

the center creating pieces of information which are independent of one another for all the combinations composed of two of predetermined digit numbers which are portions of identification numbers corresponding to the number of entities within the network being divided at every predetermined digits;

the center converting one-to-one an identifier of each entity into an identification number in terms of a predetermined function, and dividing the identification number at every predetermined digits;

the center delivering to each entity a group of pieces of information created for the combinations involving the values of portions of the identification number obtained by converting the identifier of its entity being divided at every predetermined digits;

a sender entity converting an identifier of the own entity and an identifier of a sending destination entity into respective identification numbers in terms of the predetermined function, dividing the identification numbers at every predetermined digits, selecting information corresponding to a combination of portions divided from a group of pieces of information delivered to the own entity, encrypting a communication text using an encryption key determined by selected information to send it to the sending destination entity; and the sending destination entity converting the identifier of the own entity and the identifier of the sender entity into respective identification numbers in terms of the predetermined function, dividing the identification numbers at every predetermined digits, selecting information corresponding to a combination of portions divided from the group of pieces of information delivered to the own entity and decoding a cipher text received using the encryption key determined by the selected information.

Also, according to another aspect, the present invention relates to a communication method between groups of a predetermined number of entities in a network having a plurality of entities and a center, comprising the steps of:

the center creating pieces of information which are independent of one another for all the combinations composed of the predetermined number of identification numbers corresponding to the number of entities within the network;

the center converting one-to-one an identifier of each entity into an identification number in terms of a predetermined function;

the center delivering to each entity a group of pieces of information created for the combinations involving an identification number obtained by converting an identifier of its entity;

a sender entity converting the identifier of each entity within a group into a respective identification number in terms of the predetermined function, selecting information corresponding to a combination of the identification numbers obtained by conversion from a group of pieces of information delivered to the own entity, encrypting a communication text using an encryption key determined by selected information to send it to the sending destination entity; and the sending destination entity converting the identifier of each entity within the group into a respective identification number in terms of the predetermined function, selecting information corresponding to a combination of the identification numbers obtained by conversion from the group of pieces of information delivered to the own entity and decoding a cipher text received using the encryption key determined by the selected information.

Also, according to another aspect, the present invention relates to a communication network having a plurality of entities and a center, wherein the center comprising:

creating means for creating pieces of information which are independent of one another for all the combinations composed of two of entities with the network;

delivering means for delivering to each entity a group of pieces of information created for the combinations involving its entity;

the each entity comprising:

sender means for selecting information corresponding to a combination of the own entity and a sending destination entity from a group of pieces of information delivered to the own entity, encrypting a communication text using an encryption key determined by selected information to send it to the sending destination entity; and receiver means for selecting information corresponding to a combination of the own entity and a sender entity from the group of pieces of information delivered to the own entity and decoding a cipher text received using the encryption key determined by the selected information.

Also, according to another aspect, the present invention relates to a communication network having a plurality of entities and a center, wherein the center comprising:

creating means for creating pieces of information which are independent of one another for all the combinations composed of two of identification numbers corresponding to the number of entities within the network;

conversion means for converting one-to-one an identifier of each entity into an identification number in terms of a predetermined function;

delivering means for delivering to each entity a group of pieces of information created for the combinations involving the identification number obtained by converting the identifier of its entity;

the each entity comprising:

sender means for converting an identifier of the own entity and an identifier of a sending destination entity into respective identification numbers in terms of the predetermined function, selecting information corresponding to a combination of the identification numbers obtained by conversion from a group of pieces of information delivered to the own entity, encrypting a communication text using an encryption key determined by selected information to send it to the sending destination entity; and receiver means for converting an identifier of the own entity and an identifier of a sender entity into respective identification numbers in terms of the predetermined function, selecting information corresponding to a combination of the identification numbers obtained by conversion from the group of pieces of information delivered to the own entity and decoding a cipher text received using the encryption key determined by the selected information.

Also, according to another aspect, the present invention relates to a network having a plurality of entities and a center, wherein the center comprising:

creating means for creating pieces of information which are independent of one another for all the combinations composed of two of predetermined digit numbers which are portions of identification numbers corresponding to the number of entities within the network being divided at every predetermined digits;

dividing means for converting one-to-one an identifier of each entity into an identification number in terms of a predetermined function, and dividing the identification number at every predetermined digits;

delivering means for delivering to each entity a group of pieces of information created for the combinations involving the values of portions of the identification number obtained by converting the identifier of its entity being divided at every predetermined digits;

the each entity comprising:

sender means for converting the identifier of the own entity and the identifier of a sending destination entity into respective identification numbers in terms of the predetermined function, dividing the identification numbers at every predetermined digits, selecting information corresponding to a combinations of the portions divided from a group of pieces of information delivered to the own entity, encrypting a communication text using an encryption key determined by selected information and sending it to the sending destination entity; and receiver means for converting the identifier of the own entity and the identifier of the sender entity into respective identification numbers in terms of the predetermined function, dividing the identification numbers at every predetermined digits, selecting information corresponding to a combination of the portions divided from the group of pieces of information delivered to the own entity and decoding a cipher text received using the encryption key determined by the selected information.

Also, according to another aspect, the present invention relates to a network having a plurality of entities and a center, wherein the center comprising:

creating means for creating pieces of information which are independent of one another for all the combinations composed of a predetermined number of identification numbers corresponding to the number of entities within the network;

converting means for converting one-to-one an identifier of each entity into an identification number in terms of a predetermined function; and delivering means for delivering to each entity a group of pieces of information created for the combinations involving an identification number obtained by converting the identifier of its entity;

the each entity comprising:

sender means for converting an identifier of each entity within the group into a respective identification number in terms of the predetermined function, selecting information corresponding to a combination of the identification numbers obtained by conversion from a group of pieces of information delivered to the own entity, encrypting a communication text using an encryption key determined by selected information and sending it to the sending destination entity; and receiver means for converting an identifier of each entity within the group into a respective identification number in terms of the predetermined function, selecting information corresponding to a combination of identification numbers obtained by conversion from the group of pieces of information delivered to the own entity and decoding a cipher text received using the encryption key determined by the selected information.

Other objectives and advantages besides those discussed above will be apparent to those skilled in the art from the description of the preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

The preferred embodiments of the present invention will be described below with reference to the accompanying drawings.

Key sharing between two entities will be first described in the first to third embodiments, and subsequently key sharing among three or more entities will be described.

[First Embodiment]

First, in a first embodiment, the key sharing is made in a small scale communications system (LAN computer network, etc.) with the total number of entities $N=q^m$ being equal to about several hundreds in accordance with the following procedure.

① The center makes public a function f of converting one-to-one and randomly ID into an m-digit number with base q.

Further, Gi (i=1, ... N) and £ which can satisfy the following relational expressions are generated.

$$G1 = [g11, g12, g13, \ldots, g1N]$$
$$G2 = [g21, g22, g23, \ldots, g2N]$$
$$G3 = [g31, g32, g33, \ldots, g3N]$$

$$GN = [gN1, gN2, gN3, \ldots, gNN]$$
(gij = gji: gij is an arbitrary algorithm or a random number of b bits)
$$£ = [G1, G2, G3, \ldots, GN]^T$$

② Each entity i (i=1 ... N) registers its own identifier IDi with the center and receives Gfi corresponding to fi=f(IDi) from the center.

③ An entity A generates a common key kAB from its own IDA and IDB of an entity B in accordance with the next expression, creating a cipher text C from a message text M with its kAB as the key, and sends the cipher text C with its own IDA to the entity B:

$$fB=f(IDB)$$

$$kAB=gfAfB$$

$$C=E(kAB, M):$$

(x, y) is encrypting means of y with respect to x as the key.

④ The entity B generates a common key kAB from IDA sent thereto and its own IDB in accordance with the next expression and decodes the cipher text C into the message text M:

$$fA=f(IDA)$$

$$kAB=gfBfA$$

$$M=D(kAB, C):$$

D(x, y) is decoding means of y with respect to x as the key.

With N as large as about several hundreds, Gi can be stored in a memory having the address of 10 bits or less. Also, if the output gij is a random number of 64 bits, gij can be directly used as the key of a DES password (Data Encryption Standard) which is well known as an encryption method. In this case, C=E(x, y) as above corresponds to the DES password. Also, in a basic conversion A of the DES password, the function f added to leftmost 32 bits L is not necessarily required, and omitted herein.

Figure 1:
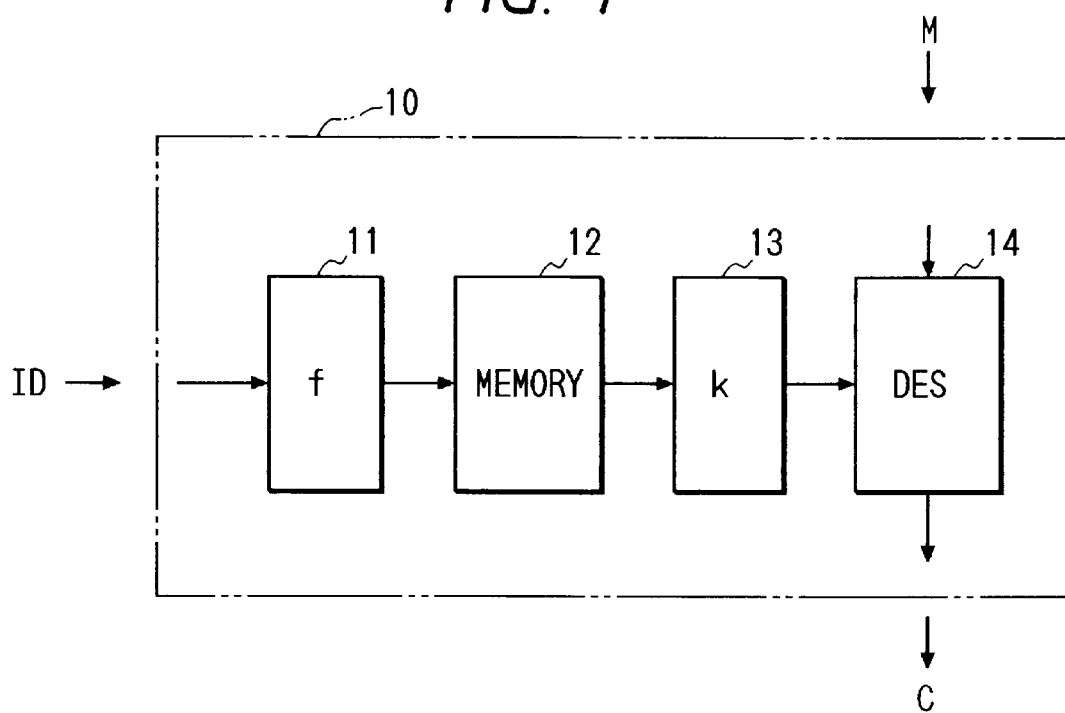
FIG. 1 is a block diagram showing the configuration of an encryption key sharing device according to the first embodiment.

In this embodiment, the key sharing can be performed by an encryption device. FIG. 1 is a block diagram showing the configuration of the encryption device which stores a matrix Gfi corresponding to an entity i delivered from the center. An encryption key sharing device comprises a conversion unit 11 for converting an entity identifier IDj of communication partner into fj=f(IDj) in terms of a function f, a memory 12 for storing a matrix Gfi=[gfi1, gfi2, ... , gfiN] to output a random number gfifj of 64 bits with fj as the address, a key register 13 for storing gfifj with kij as a key, and a DES encryption circuit 14 for converting a message text M into a cipher text C using the key kij. Also, in an encryption device 10 of an entity j on the receiver end, if IDi of an entity i on the sender end is input into the conversion unit 11, fi=f(Di) is output, and gfjfi is output from the memory 12 storing Gfj, with this fi as the address, and stored in the key register 13 with gfjfi=gfifj as the common key kij of i and j, wherein the DES encryption circuit 14 decodes the cipher text C into the message text M.

Figure 2:
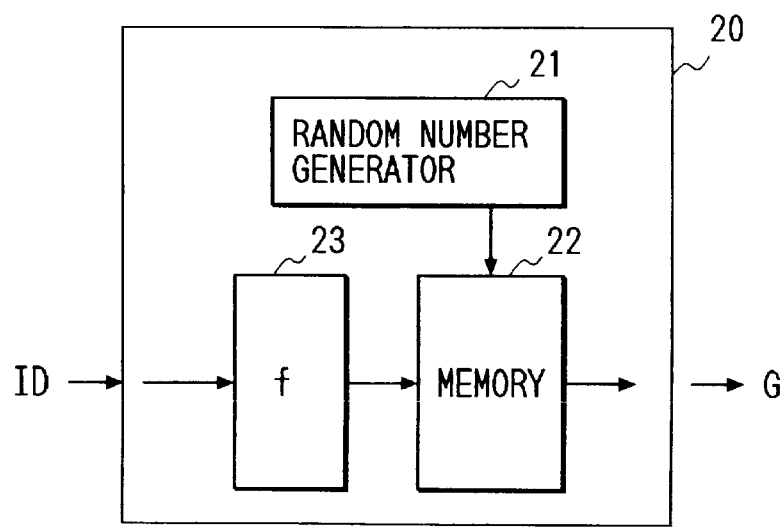
FIG. 2 is a block diagram showing the configuration of a center.

FIG. 2 is a block diagram showing the configuration of a center.

In the center 20, a random number generator 21 generates the random number of b bits (see blocks 30 and 32 of FIG.

8). This may be achieved either by putting together random numbers generated in units of less than b bits to the length of b bits, or extracting the part of predetermined bits from random numbers generated in units of more than b bits.

22 is a memory for storing random numbers of b bits obtained sequentially from the random number generator 21 as gij for i as well as gji for j, for i=1, 2, . . . N, and j=1, i+1, . . . N, and eventually storing Gi=[gi1, gi2, . . . giN] for each i, so that gij=gji is satisfied for any i and j.

Figure 8:
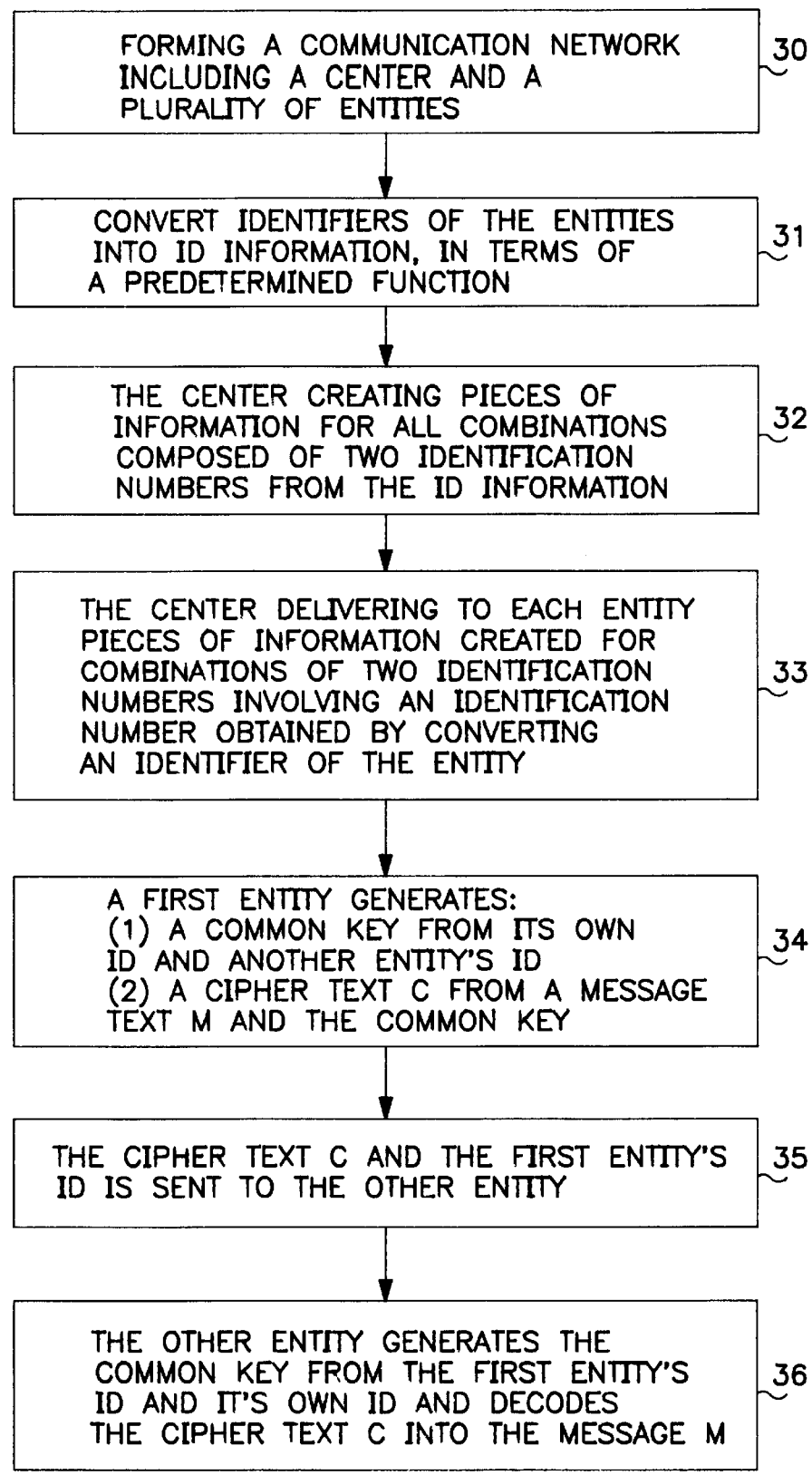
FIG. 8 is a flow diagram depicting a method in accordance with this invention.

23 is a conversion unit for converting uniquely IDi of input entity i into fi=f(IDi) which is a m-digit number with base q in terms of a function f (block 31 of FIG. 8). The memory 22 has Gfi=[gfi1, gfi2, . . . gfiN] output for fi from the conversion unit. The center 20 reads Gfi based on IDi for each entity i and delivers it (block 33 of FIG. 8).

[Second embodiment]

An encryption key sharing method and device according to the second embodiment will be next described.

In a large-scale network such as the general line, the total number of entities N is so great as to require a very large memory to store a matrix Gfi as described in the first embodiment. In this embodiment, on the contrary, when the total number of entities N is very large, any large memory is dispensed with by virtue of the following method.

Figure 3:
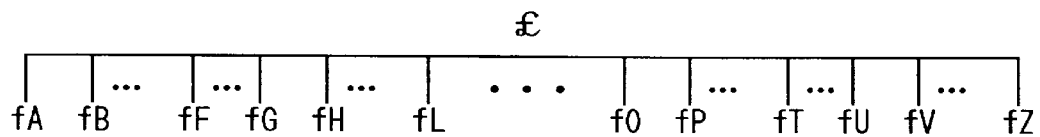
FIG. 3 is an explanatory representation showing a large scale communications system.

FIG. 3 is an explanatory representation showing a large scale communications system.

Figure 4:
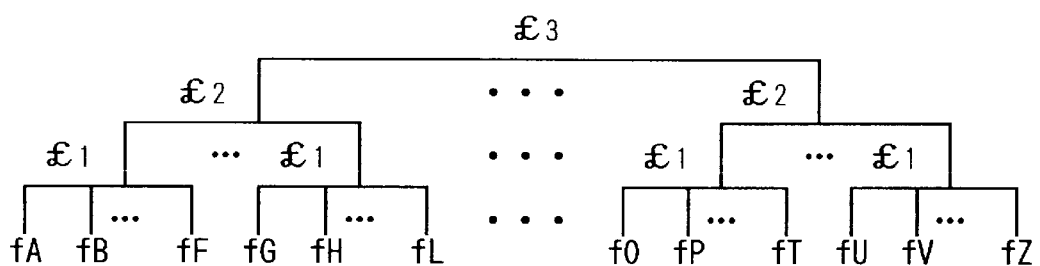
FIG. 4 is an explanatory representation showing a large scale communications system which is of hierarchical structure.

Since fi=f(IDi) corresponds to the address of entity i (FIG. 3), fi of m bits is first divided into fih (h=1 . . . p) at every y bits (where yxp=m) to consider the large scale communications system of FIG. 2 to be hierarchical as shown in FIG. 4. £ h as shown below is created separately for an entity with the number of personnels n=$q^1$ at the h-th layer.

$$£ h=[Gh1, Gh2, Gh3, \ldots, Ghn]$$

Accordingly, the key sharing procedure of FIG. 4 is stated as follows.

The center makes public a function f for converting, one-to-one and randomly, ID into an m-digit number with base q.

Further, Ghi (h=1 . . . p, i=1 . . . n) and £ h which can satisfy the following relational expressions with the number of layers p are generated:

Gh1 = [gh11, gh12, gh13, . . . , gh1n]
Gh2 = [gh21, gh22, gh23, . . . , gh2n]
Gh3 = [gh31, gh32, gh33, . . . , gh3n]
        .
        .
Ghn = [ghn1, ghn2, ghn3, . . . , ghnn]
(ghij = ghji: ghij is an arbitrary algorithm or a random number of b bits)
£ h = [Gh1, Gh2, Gh3, . . . , Ghn]$^T$ ② Each entity i (i=1 . . . n) registers its own identifier IDi with the center and receives Ghfih corresponding to fih (h=1 . . . p) where fi=f (IDi) is divided at every y bits from the center.

③ An entity A generates kAB from its own IDA and IDB of an entity B in accordance with the next expression.

The entity A creates a cipher text C as below from a message text M with kAB as the common key, and sends the cipher text C with its own IDA to the entity B (blocks 34 and 35 of FIG. 8):

$$fB=f(IDB)$$

$$kAB=\epsilon \ ghfAhfBh$$

(is algorithm, $\epsilon$ means the synthesis of plural algorithms.)

$$C=E(kAB, M)$$

④ The entity B generates a common key kAB from IDA sent thereto and its own IDB in accordance with the next expression and decodes the cipher text C (block 36 of FIG. 8):

$$fA=f(IDA)$$

$$kAB=\epsilon \ ghfBhfAh$$

$$M=D(kAB, C)$$

For example, in a large-scale network where the total number of entities N is supposed to be as many as one trillion (q=10, m=12), with N=$10^{12}$ to $2^{40}$, the large scale communications system of FIG. 3 requires a memory having the address of 40 bits, which is infeasible. However, in a large scale communications system which is of hierarchical structure as shown in FIG. 4, p=6, if 1=2, wherein it is constituted of 6 layers, with n=$10^2$ to $2^7$, and is sufficient with six memories of the 7-bit address. If 1=1, it is constituted of 12 layers, with n=10 to $2^4$, and sufficient with 12 memories of the 4-bit address. If each ghij is a random number of 6 bits, the system has roughly 3834 gates and 959 gates in respective cases which can be sufficiently implemented with the C-MOS gate.

Accordingly, the hierarchical structure as shown in FIG. 4 can be prepared for a sufficiently large total number of entities N. Also, with this system, it is only necessary to place further layers on previously existing layers when the value of N is required to increase, wherein the system has high extensibility (with an increase of one layer, the number of entities is increased n times). In this case, the processing for each layer is identical though the content of memory is different, and can be sufficient with the same circuit configuration.

Figure 5:
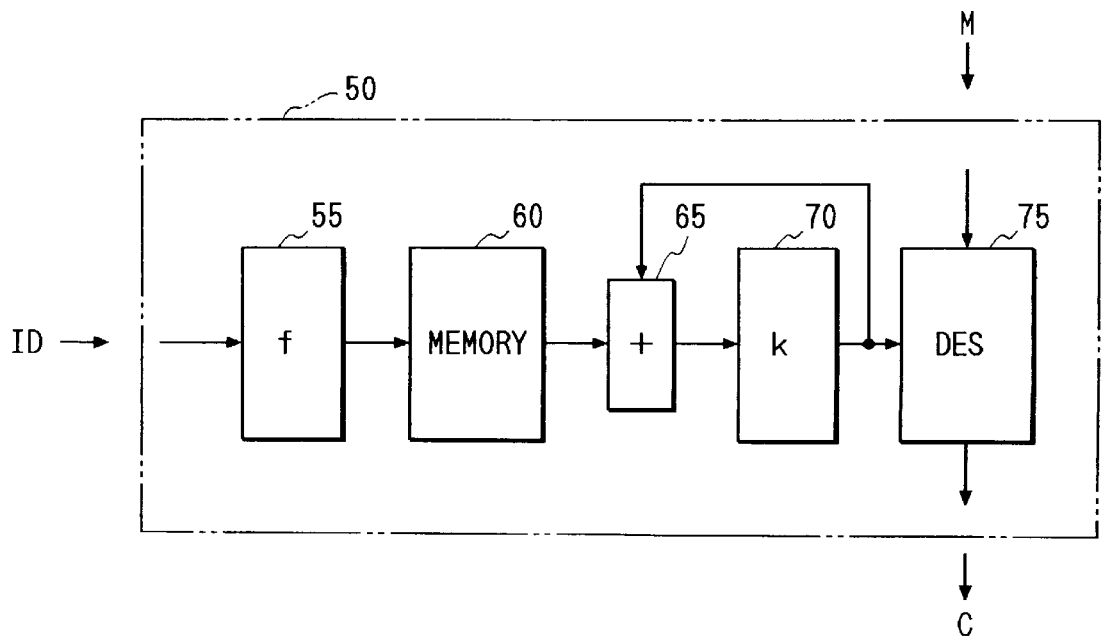
FIG. 5 is a block diagram showing the configuration of an encryption key sharing device according to the second embodiment.

FIG. 5 is a block diagram showing the configuration of an encryption device 50 according to the second embodiment.

The encryption device 50 comprises a memory 55 for storing the value fjh in which ID of entity j is converted in terms of a function f and divided at every y bits, a memory 60 for storing Ghfjh (h=1 . . . p) corresponding to divided fjh, a synthesizer 65 for synthesizing ghfihfjh (h=1 . . . p) output corresponding to every 6 bits in accordance with EXOR or an algorithm, a key register 70 for storing the common key kij (=$\epsilon$ ghfifjh), and a DES encryption circuit 75 for converting the message text M into the cipher text C using the common key kij.

Hence, to share the encryption key by means of the encryption device 50 as shown in FIG. 5, Ghfih (h=1 . . . p), corresponding to fih, in which the matrix Gfi corresponding to entity i delivered from the center is divided at every y bits, are first stored in the memory 60. Then, if the IDj of entity j which becomes a communication partner is input into the memory 55, fj=f(IDj) is output, and if the value fjh in which fj is divided at every y bits is input as the address into the memory 60, ghfihfjh (h=1 . . . p) are output from the memory 60. By repeating in the synthesizer 65 the EXOR operation of new ghfihfjh and previous sum $\epsilon$ ghfihfjh which is already EXOR operated and stored in the key register 70, the common key kij is generated. And the DES encryption circuit 75 converts the message text M into the cipher text C with kij as the key.

[Third Embodiment]

An encryption key sharing method and device will be described below.

Figure 6:
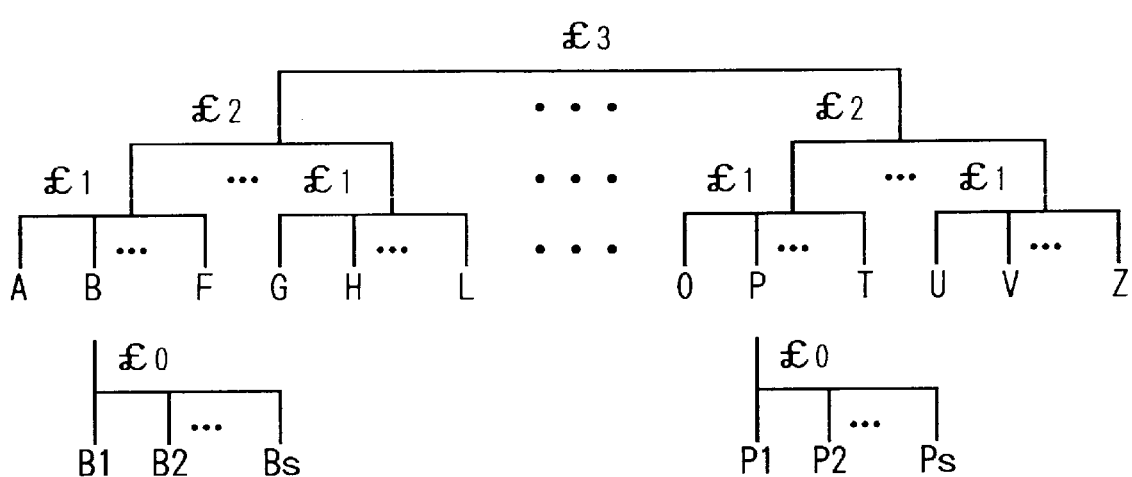
FIG. 6 is a representation for explaining how to make an encryption key intrinsic in a communications system according to the third embodiment.

The conventional key sharing method without preliminary communication has the drawback that it cannot prevent attack from one center, whereas the encryption key sharing method and device according to the third embodiment are characterized by the key being made intrinsic to prevent attack. FIG. 6 is an explanatory representation showing how to make the key intrinsic in the communications system according to the third embodiment. In FIG. 6, the layers at $£_1$ or higher are identical to those as explained in the second embodiment, corresponding to the general line. The entity B is considered to be a firm or a route directory. Normally, there are many layers corresponding to personnel or user directories under the entity B. Accordingly, a department for managing personnel or user directories (sub-entities) in the entity B determines $£_0$ by itself and delivers it to sub-entities of B ($B_1, B_2, \ldots, B_s$). The sub-entities of B generate a secret key which is employed only in the B, and add it to a key KBB which is determined at $£_1$ layer or higher. Thereby, B can protect the secret within the group of B from the center. In this way, the encryption device in accordance with the method of this embodiment is applicable to cases wherein a sub-entity of B on duty communicates with the sub-entities within B using the general line at $£_1$ or higher by constructing the encryption device in, for example, the IC card.

Also, where a branch office of B is located at P, it is protected against attack from the center by using the general line at $£_1$ or higher if $£_0$ is similarly predefined:

$$KBij = KBP + goij$$

(when goij is an algorithm,+signifies the synthesis of algorithms).

Also, attack from the center can be prevented by the following method. It is supposed that A, B belong to a specific group, and a password which is only known to A and B can be determined. Then, A, B synthesize a value or algorithm specified from the password PWAB between A and B to the normal common key KAB. Thereby, A, B can prevent attack from the center.

KAB=KAB+g (PWAB): g(x) is an algorithm determined by x. Also, by using this, the group key sharing among three or more persons can be simply performed by sharing the password.

Accordingly, for the key sharing between A and B, it is only necessary to finally make the next operation. When there is no item corresponding to the personnel number and password, the key sharing in the general line can be effected by having IDA1=IDB2=PWAB=0:

$$KAB = \epsilon\ ghfAhfBh + g0A1B2 + PWAB$$

To make this key intrinsic, the center, in delivering the encryption key sharing device 10, 50 as shown in FIG. 1 and FIG. 5, may deliver it to each entity with a space area of memory storing GOn corresponding to an intrinsic array $£_0$ left. On the delivered entity side, IDj of entity may be input in the encryption device 10, 50 to generate the common key in the general line, and then the sub-entity ID or password may be further input and added to this common key.

Also, in order for B to determine an intrinsic array $£_0$ of B, it is only necessary to repeat the following rules (1) and (2) $n \cdot (n+1)/2$ times, which is quite simple (also the intensity to the collusion can be determined by the memory capacity, and is unnecessary to consider:

(1) Determine arbitrarily one array element of $£_0$.

(2) Arrange the determined array element at i row, j column and j row, i column.

By making the key intrinsic as presented above, attack on other entities by collusion between entities can be simultaneously prevented. Even with collusion between entities, layers at $£_1$ or higher only are known, wherein even if all the entities of A to Z except B are in collusion, the intrinsic array $£_0$ of B is not known, and B thus is safe.

Further, if the B firm with $£_0$ determined is subjected to damage such as tapping or tampering, it follows that there must be a colluder inside B, so that the offender can likely be identified. Also, if the password has been determined, it follows that the person sharing the password is an offender or a responsible person who has leaked the secret, whereby the offender is also likely to be identified.

[Fourth Embodiment]

An encryption key sharing method and device according to the fourth embodiment will be described below. This embodiment has a feature of key sharing among three entities.

The key sharing procedure of this embodiment is as follows.

① The center makes public a one-way function f for converting one-to-one and randomly, ID into an m-digit number with base q. Further, Gi (3) (i=1, ... N) and £ (3) which can satisfy the following relational expressions are generated (gij=gji: gij is an arbitrary function or a random number of b bits):

$$Gi(3) = [Gi(2),\ gi12,\ gi13,\ gi14,\ \ldots,\ gi1N,$$
$$gi23,\ gi24,\ \ldots,\ gi2N,$$
$$gi34,\ \ldots,\ gi3N,$$
$$\vdots$$
$$giNN]$$

$$£(3) = [G1(3),\ G2(3),\ \ldots,\ GN(3)]^T$$

② Each entity i (i=1 ... N) registers its own identifier IDi with the center and receives Gfi(3) corresponding to fi=f (IDi) from the center.

③ An entity A generates KABC as below from its own IDA and IDB, IDC of entities B, C in accordance with the next expression. And it creates a cipher text C from a message text M with KABC as the common key, and sends the cipher text C with IDA, IDB, IDC to the entities B, C:

$$fB = f(IDB),\ fC = f(IDC)$$

$$KABC = gfAfBfC$$

$$C = E(KABC,\ M)$$

④ An entity B generates a common key KABC from IDA, IDB, IDC sent thereto in accordance with the next expression and decodes the cipher text C:

$$fA = f(IDA),\ fC = f(IDC)$$

$$KABC = gfBfAfC$$

$$M = D(KABC,\ C)$$

⑤ An entity C similarly generates a common key KABC in accordance with the next expression and decodes the cipher text C:

$fA=f(IDA), fB=f(IDB)$ $KABC = gfCfBfA$ $M = D(KABC, C)$

Figure 7:
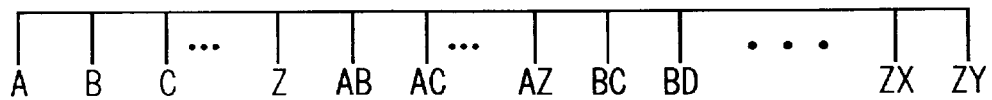
FIG. 7 is a representation for explaining the group sharing of an encryption key.

This is an extended concept of the key sharing between two entities as described. FIG. 7 is an explanatory representation showing the group key sharing in the communications system. In FIG. 7, A to Z show each entity as in the embodiments 1 to 3. In attempting the key sharing among A, B and C, A shares the key with BC, B shares the key with AC, and C shares the key with AB. Because of gABC=gBAC=gCAB, A, B, C can share the key.

Also, for a large total number of entities N, the hierarchical structure as shown in the second embodiment is used as follows.

① The center makes public a one-way function f of converting one-to-one and randomly the center ID into a m-dimensional horizontal vector. Further, it creates Ghi (3) (h=1 ... p, i=1 ... n) and £ h(3) which can satisfy the following p relational expressions as shown below, wherein Ghi(s) shows a key generation matrix for up to s persons:

$(ghijk = ghjik = ghkji$: arbitrary function or random number of $b$ bits$)$ $$Ghi(3) = [Ghi(2), \quad ghi12, \quad ghi13, \quad ghi14, \quad \ldots, \quad ghi1n,$$
$$gi23, \quad gi24, \quad \ldots, \quad ghi2n,$$
$$gi34, \quad \ldots, \quad ghi3n,$$
$$\vdots$$
$$ghinn]$$

$£h(3) = [Gh1(3), Gh2(3), Gh3(3), \ldots, Ghn(3)]^T, (n = q^\wedge mh)$

② Each entity i (i=1 ... N) registers its own identifier IDi with the center and receives Gfih (h=1 ... p) corresponding to fih with fi=f(IDi) divided at every y bits from the center.

③ An entity A generates KABC from its own IDA and IDB, IDC of entities, B, C in accordance with the next expression (and it creates a cipher text C from a message text M with KABC as the common key, and sends the cipher text C with IDA, IDB, IDC to the entities B, C:

$fB=f(IDB), fC=f(IDC)$ $KABC = \epsilon\ ghfAhfBhfCh$ $C = E(KABC, M)$

④ An entity B generates a common key KABC from IDA, IDB, IDC sent thereto in accorance with the next expression and decodes the cipher text C:

$fA=f(IDA), fC=f(IDC)$ $KABC = \epsilon\ ghfBhfAhfCh$ $M = D(KABC, C)$

⑤ An entity C similarly generates a common key KABC in accordance with the next expression and decodes the cipher text C:

$fA=f(IDA), fB=f(IDB)$ $KABC = \epsilon\ ghfChfBhfAh$ $M = D(KABC, C)$

In this case, the size of Gi increases from n to n(n+1)/2 as compared with the key sharing between two persons. Accordingly, with the use of such a hierarchical structure, the key sharing among three persons can be implemented, like the communications system as shown in FIG. 7, by adding a further p layers to the communications system having p layers composed of n entities.

Accordingly, it is apparent that the group key sharing can be implemented by an encryption key sharing a device similar to that as shown in FIGS. 1 and 5. However, in this case, ID signifies IDs for a plurality of persons.

Key sharing among s persons can be realized by placing thereon layers. However, to achieve key sharing among s persons, it is necessary to give Gi(s). Since Gi(s−1) is contained in a part of Gi(s), Gi(s−1) and Gi(s) can exist simultaneously. However, Gi(s) may require a larger capacity memory than Gi(s−1), but because this system has a simple and identical processing for each layer, and the large capacity memory is readily available recently, the group key sharing device among many persons can be sufficiently realized. Also, because the key sharing method among a small number of persons and the key sharing method among a great number of persons can exist simultaneously, the device can be extended as necessary.

It is needless to say that the intrinsic property of the key as shown in the third embodiment is also effective for the key sharing method among three or more persons as shown in this embodiment.

Various variations for the encryption key sharing method and device of this embodiment can be made without departing from the scope of the invention as defined in the claims. For example, in this embodiment, only one encryption key sharing method for each layer is used, but the encryption key sharing method may be different for each layer, or in a combination of conventional key sharing methods.

Also, the concept of the intrinsic property of the key may be implemented by a combination of different methods or by the conventional method.

Further, the encryption key and the encryption key generating algorithm which can be arbitrary may be specified by each entity or generated by the center.

Also, the concept of using ID as the address, but not as the variable for the generation of encryption key, is applicable not only to the encryption key sharing method of the invention, but also to other encryption key sharing methods and encryption standards.

Further, when the password between entities or the encryption key between entities is a random number, the entities can make arrangements with each other in accordance with the key delivering method having preliminary communication as shown in the conventional example.

Also, the encryption key sharing device as shown in FIG. 1 or 5 can attain a higher level of safety if it takes the form of a physically protected computer, such as an IC card.

Further, for a network having a plurality of independent centers, the same encryption key sharing device can be utilized by synthesizing the encryption keys or encryption key generating algorithms for the centers within the encryption key sharing device.

In procedures ③, ④ in each of the embodiments, the key can be altered for each cipher text in the following way after obtaining the common key KAB.

③ The entity A sends R having a random number r encrypted from KAB together with its own IDA to B, and also sends C having the message text M encrypted by r to B:

$$R = E1 \ (KAB, r)$$

$$C = E2 \ (r, M)$$

④ The entity B decodes R into r using a common key KAB generated, and decodes C into the message text M by using r:

$$r = D2 \ (KAB, R)$$

$$M = D1 \ (r, M)$$

In this case, the encryption standards (E1, D1) and (E2, D2) may be identical. This r can be used as the group key by sending the same r to entities of two or more persons.

The encryption key sharing method and device of this embodiment has the following features in contrast with the conventional key sharing method.

(Preparation) The center determines a plurality of algorithms gij arbitrarily and send them to entities i, j.

(Key sharing) When the entities A, B want to share the key, both A and B directly use gAB occurring at the AB-th location from their own algorithms as the common key.

Thereby, the drawbacks with conventional methods can be eliminated in the following way.

1) Since any given algorithm gij is in common use only for i, j, it is not likely to be broken collusion.

2) The extension of the system or safety can be made simply as shown in the second and fourth embodiments. Also, because the safety does not rely on the mathematical affairs such as the computational complexity or the rank of matrix, the simpler computational method can be chosen. Also, the value or procedure designated from the entity can be employed as the encryption key or encryption key generating procedure.

3) Any attack from the center can be prevented by having separate keys as in the third embodiment.

As described above, with this system, the encryption key delivering method having the following features can be implemented without making a preliminary communication prior to the encrypted communication.

1) Because the center can collectively make arrangements of the encryption key which individual entities made separately, the key sharing will result in less trouble. Also, because the encryption key is set by supposing a sufficiently large number of entities, key sharing among indefinitely many entities is allowed without having preliminary communication.

2) The relation between ID and the encryption key is simpler because it is affected only by correspondence of the number without relying on the mathematical system. Also, a higher level of safety can be attained by simply increasing the memory capacity. Accordingly, if a larger memory can be used cheaply than conventionally, a safer system can be constructed simply.

3) By using the memory in hierarchical configuration, the device can be simplified. For example, when the total number of entities N is one trillion persons, with $N=10^{12}=2^{40}$ in FIG. 3, a memory having the address of 40 bits is required and cannot be realized. However, the memory results in the hierarchical structure (mh=2, P=6) as shown in FIG. 3, with $n=10^2=2^7$, wherein 6 memories of the 7-bit address may be sufficient, and the key sharing among one trillion persons can be effected in small circuit scale.

4) The key can be made intrinsic because each entity has an individual layer. If a certain entity determines an intrinsic key generating array for the layers under its own entity as shown in FIG. 6, the common key can be generated completely from other entities and centers.

5) Furthermore, because the hierarchical structure and the intrinsic property can be used for the extended total number of entities and the group key sharing, a flexible encryption key sharing system can be constructed.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A communication method for communication between entities in a network having a plurality of entities and a center, comprising the steps of:

said center converting one-to-one identifiers of the plurality of entities into identification numbers, respectively, in terms of a predetermined function;

said center creating pieces of information which are independent of one another for all combinations composed of two of the identification numbers;

said center delivering to each entity a group of pieces of information created for combinations of two identification numbers involving an identification number obtained by converting an identifier of that entity;

a sender entity converting an identifier of a destination entity into an identification number thereof in terms of the predetermined function, selecting information corresponding to the identification number of said destination entity obtained by conversion from a group of pieces of information delivered to the sender entity, encrypting a communication text using an encryption key depending on the selected information corresponding to the identification number of said destination entity, and sending encrypted text to said destination entity; and said destination entity receiving the encrypted text, converting an identifier of said sender entity into an identification number thereof in terms of the predetermined function, selecting information corresponding to the identification number of said sender entity obtained by conversion from the group of pieces of information delivered to the destination entity, and decoding the encrypted text using an encryption key depending on the selected information corresponding to the identification number of said sender entity.

2. A method according to claim 1, further comprising the step of storing for each identification number a group of piece information created for all combinations involving that identification number in a memory at an address corresponding to that identification number.

3. A method according to claim 1, wherein said information is a random number of predetermined bits.

4. A method according to claim 3, wherein the encryption key determined by selected information is the selected information itself.

5. A method according to claim 1, wherein said information is information for designating an algorithm.

6. A method according to claim 1, wherein an entity has a plurality of sub-entities, and in the communication between sub-entities, an encryption key is determined by further using intrinsic information between said sub-entities.

7. A method according to claim 6, wherein said intrinsic information is a password determined between specific two entities.

8. A method according to claim 1, wherein an entity has a plurality of sub-entities, and in the communication between sub-entities of specific two entities, an encryption key is determined by further using intrinsic information between said specific two entities.

9. A method according to claim 1, wherein said intrinsic information is an identifier of each sub-entity.

10. A communication method for communication between entities in a network having a plurality of entities and a center, comprising the steps of:

said center converting one-to-one identifiers of said plurality of entities into identification numbers, respectively, in terms of a predetermined function and dividing each of the identification numbers at every nth digit, where n is a predetermined number, to produce portions of those identification numbers;

said center creating pieces of information which are independent of one another for all combinations composed of two numbers from among the portions of the identification numbers;

said center delivering to each entity a group of pieces of information created for combinations of two identification numbers involving the values of portions of the identification number obtained by converting the identifier of that entity, and dividing the converted identification number at every nth digit;

a sender entity converting an identifier of a destination entity into an identification number thereof in terms of the predetermined function, dividing the identification number at every nth digit to produce portions of that identification number, selecting information corresponding to portions of the identification number of said destination entity from a group of pieces of information delivered to the sender entity, encrypting a communication text using an encryption key depending on the selected information corresponding to the portions of the identification number of said destination entity, and sending encrypted text to said destination entity; and said destination entity receiving the encrypted text, converting an identifier of the sender entity into an identification number thereof in terms of the predetermined function, dividing the identification number at every nth digit to produce portions of that identification number, selecting information corresponding to portions of the identification number of said destination entity from the group of pieces of information delivered to the destination entity and decrypting the encrypted text using an encryption key depending on the selected information corresponding to the portions of the identification number of said sender entity.

11. A method according to claim 10, wherein said information is a random number of predetermined bits.

12. A method according to claim 11, wherein the encryption key determined by selected information is a sum of information selected for a combination of the portions of the identification numbers.

13. A method according to claim 10, wherein said information is information for designating an algorithm.

14. A communication method between groups of a predetermined number of entities in a network having a plurality of entities and a center, comprising the steps of:

said center converting one-to-one identifiers of said plurality of entities into identification numbers, respectively, in terms of a predetermined function;

said center creating pieces of information which are independent of one another for all combinations composed of the predetermined number of the identification numbers;

said center delivering to each entity a group of pieces of information created for combinations of two identification numbers involving an identification number obtained by converting an identifier of a respective entity;

a sender entity converting identifiers of destination entities into respective identification numbers in terms of the predetermined function, selecting information corresponding to a combination of the identification numbers of said destination entities obtained by conversion from a group of pieces of information delivered to the sender entity, encrypting a communication text using an encryption key depending on the selected information corresponding to the identification numbers of said destination entities, and sending encrypted text to said destination entities; and each of said destination entities receiving the encrypted text converting the identifiers of other entities in the group into respective identification numbers in terms of the predetermined function, selecting information corresponding to a combination of the identification numbers of the other entities obtained by conversion from the group of pieces of information delivered to respective destination entities, and decrypting the encrypted text using an encryption key depending on the selected information corresponding to the-identification numbers of the other entities.

15. A method according to claim 14, further comprising the step of storing for each identification number a group of pieces of information created for all combinations involving that identification number in a memory at an address corresponding to that identification number.

16. A method according to claim 14, wherein said information is a random number of predetermined bits.

17. A method according to claim 16, wherein said encryption key is a random number of predetermined bits which is said selected information.

18. A method according to claim 14, wherein said information is information for designating an algorithm.

19. A communication network having a plurality of entities and a center, wherein said center comprises:

conversion means for converting one-to-one identifiers of said plurality of entities into identification numbers, respectively, in terms of a predetermined function;

creating means for creating pieces of information which are independent of one another for all combinations composed of two of the identification numbers; and delivering means for delivering to each entity a group of pieces of information created for combinations of two identification numbers involving an identification number obtained by converting an identifier of that entity, and said each entity comprising:

sender means for converting an identifier of a destination entity into an identification number thereof in terms of the predetermined function, selecting information corresponding to the identification number of the destination entity obtained by conversion from a group of pieces of information delivered to the sender entity, encrypting a communication text using an encryption key depending on the selected information corresponding to the identification number of the destination entity, and sending encrypted text to said destination entity; and receiver means for receiving the encrypted text, converting an identifier of a sender entity into an identification number thereof in terms of the predetermined function, selecting information corresponding to the identification number of the sender entity obtained by conversion from the group of pieces of information delivered to the destination entity, and decoding the encrypted text using an encryption key depending on the selected information corresponding to the identification number of the sender entity.

20. A network according to claim 19, wherein, for each identification number, a group of pieces of information created for all the combinations involving the identification number for that identification number at an address corresponding to that identification number is stored.

21. A network according to claim 19, wherein said information is random number of predetermined bits.

22. A network according to claim 21, wherein said encryption key determined by selected information is the selected information itself.

23. A network according to claim 22, wherein said information is information for designating an algorithm.

24. A network according to claim 19, wherein an entity has a plurality of sub-entities, and in the communication between sub-entities, an encryption key is determined by further using intrinsic information between said sub-entities.

25. A network according to claim 24, wherein said intrinsic information is an identifier of each sub-entity.

26. A network according to claim 24, wherein said intrinsic information is a password determined between specific two entities.

27. A network according to claim 19, wherein an entity has a plurality of sub-entities, and in the communication between sub-entities of specific two entities, an encryption key is determined by further using intrinsic information between said specific two entities.

28. A network having a plurality of entities and a center, wherein said center comprises:
conversion means for converting one-to-one identifiers of said plurality of entities into identification numbers, respectively, in terms of a predetermined function and dividing each of the identification numbers at every nth digit, where n is a predetermined number;
creating means for creating pieces of information which are independent of one another for all combinations composed of two numbers of the predetermined digits which are portions of identification numbers being divided at every nth digit;
delivering means for delivering to each entity a group of pieces of information created for combinations of two identification numbers involving the values of portions of the identification number obtained by converting the identifier of that entity being divided at every nth digit, and each said entity comprising:
sender means for converting the identifier of a destination entity into an identification number thereof in terms of the predetermined function, dividing the identification number at every nth digit, selecting information corresponding to the portions of the identification number of said destination entity divided at every nth digit from a group of pieces of information delivered to the sender entity, encrypting a communication text using an encryption key depending on the selected information corresponding to the portions of the identification number of said destination entity, and sending encrypted text to the destination entity; and
receiver means for receiving the encrypted text, converting an identifier of the sender entity into an identification number in terms of said predetermined function, dividing the identification number at every nth digit, selecting information corresponding to portions of the identification number of said destination entity divided at every nth predetermined digit from the group of pieces of information delivered to the destination entity and decoding the encrypted text using an encryption key depending on the selected information corresponding to the portions of the identification number of said sender.

29. A network according to claim 28, wherein said information is a random number of predetermined bits.

30. A network according to claim 29, wherein said encryption key determined by selected information is a sum of information selected for a combination of the portions of the identification numbers.

31. A network according to claim 29, wherein said information is information for designating an algorithm.

32. A network having a plurality of entities and a center, wherein said center comprises:
conversion means for converting one-to-one identifiers of said plurality of entities into identification numbers, respectively, in terms of a predetermined function;
creating means for creating pieces of information which are independent of one another for all combinations composed of a predetermined number of the identification numbers; and
delivering means for delivering to each entity a group of pieces of information created for combinations of two identification numbers involving an identification number obtained by converting the identifier of that entity, and each said entity comprising:
sender means for converting identifiers of destination entities into respective identification numbers in terms of said predetermined function, selecting information corresponding to a combination of the identification numbers of said destination entities obtained by conversion from a group of pieces of information delivered to the sender entity, encrypting a communication text using an encryption key depending on the selected information corresponding to the identification numbers of said destination entities, and sending encrypted text to the destination entities; and
receiver means for receiving encrypted text, converting the identifiers of other entities within the group into respective identification numbers in terms of said predetermined function, selecting information corresponding to a combination of the identification numbers of those other entities obtained by conversion from the group of pieces of information delivered to respective destination entities, and decoding the encrypted text using an encryption key depending on the selected information corresponding to the identification numbers of the other entities.

33. A network according to claim 32, wherein, for each identification number, a group of pieces of information created for all combinations involving that identification number is stored in a memory means at an address corresponding to that identification number.

34. A network according to claim 32, wherein said information is a random number of predetermined bits.

35. A network according to claim 34, wherein said encryption key is a random number of predetermined bits which is said selected information.

36. A network according to claim 32, wherein said information is information for designating an algorithm.

* * * * *

UNITED STATES PATENT AND TRADEMARK OFFICE
CERTIFICATE OF CORRECTION

PATENT NO.    : 5,966,449
DATED         : October 12, 1999
INVENTOR(S)   : KEIICHI IWAMURA ET AL.

It is certified that error appears in the above-identified patent and that said Letters Patent is hereby corrected as shown below:

ON THE TITLE PAGE [56] References Cited:

U.S. PATENT DOCUMENTS, 5,222,137 6/1993 Barret e.t al" should read --5,222,137 6/1993 Barrett et al.--; and
FOREIGN PATENT DOCUMENTS, "4150428" should read --4-150428--.

SHEET 4:

FIGURE 8, "IT'S" should read --ITS--.

COLUMN 6:

Line 13, "digits; should read --digit;--;
Line 18, "digits; should read --digit;--;
Line 25, "combinations" should read --combination--; and
Line 35, "digits," should read --digit,--.

COLUMN 7:

Line 58, "randomly ID" should read --randomly an ID--.

COLUMN 9:

Line 38, "¶ The" should read --¶ ① The--.

COLUMN 10:

Line 1, "(is algorithm, ∈" should read --(∈--.

UNITED STATES PATENT AND TRADEMARK OFFICE
CERTIFICATE OF CORRECTION

PATENT NO.   : 5,966,449
DATED        : October 12, 1999
INVENTOR(S)  : KEIICHI IWAMURA ET AL.

It is certified that error appears in the above-identified patent and that said Letters Patent is hereby corrected as shown below:

COLUMN 11:

Line 67, "consider: should read --consider):--.

COLUMN 12:

Line 25, "converting" should read --converting,--.

COLUMN 13:

Line 43, "(and it creates" should read --(and creates--; and
    Line 54, "accorance" should read --accordance--.

COLUMN 15:

Line 21, "send" should read --sends--; and
    Line 28, "broken collusion." should read --broken by collusion.--

COLUMN 16:

Line 8, "form" should read --forms--.

COLUMN 17:

Line 6, "claim 1," should read --claim 6,--.

COLUMN 18:

Line 26, "the-identification" should read --the identification--.

UNITED STATES PATENT AND TRADEMARK OFFICE
CERTIFICATE OF CORRECTION

PATENT NO. : 5,966,449
DATED : October 12, 1999
INVENTOR(S) : KEIICHI IWAMURA ET AL.

It is certified that error appears in the above-identified patent and that said Letters Patent is hereby corrected as shown below:

COLUMN 19:

Line 13, "is random" should read --is a random--.

Signed and Sealed this

Twenty-ninth Day of May, 2001

Attest:

NICHOLAS P. GODICI

Attesting Officer

Acting Director of the United States Patent and Trademark Office